US012046188B2

(12) United States Patent
Go et al.

(10) Patent No.: US 12,046,188 B2
(45) **Date of Patent: *Jul. 23, 2024**

(54) DISPLAY DEVICE WITH DUTY CYCLE CONTROL AND DRIVING METHOD THEREOF

(71) Applicant: LG Display Co., Ltd., Seoul (KR)

(72) Inventors: Jae Yeong Go, Paju-si (KR); Tae Gung Kim, Paju-si (KR); Dae Sung Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,246

(22) Filed: Jun. 22, 2023

(65) Prior Publication Data

US 2023/0335046 A1 Oct. 19, 2023

Related U.S. Application Data

(63) Continuation of application No. 17/965,167, filed on Oct. 13, 2022, now Pat. No. 11,741,891.

(30) Foreign Application Priority Data

Dec. 29, 2021 (KR) ........................ 10-2021-0191865

(51) Int. Cl.
*G09G 3/32* (2016.01)

(52) U.S. Cl.
CPC ....... *G09G 3/32* (2013.01); *G09G 2310/0205* (2013.01); *G09G 2310/0221* (2013.01); *G09G 2310/08* (2013.01); *G09G 2320/0233* (2013.01); *G09G 2320/0247* (2013.01); *G09G 2320/08* (2013.01); *G09G 2340/0407* (2013.01); *G09G 2340/16* (2013.01); *G09G 2360/12* (2013.01)

(58) Field of Classification Search
CPC ................. G09G 3/32; G09G 2310/08; G09G 2320/0233; G09G 2320/0247; G09G 2320/08; G09G 2340/0407
See application file for complete search history.

(56) References Cited

U.S. PATENT DOCUMENTS

| | | | | |
|---|---|---|---|---|
| 8,305,310 | B2 | 11/2012 | Matsui et al. | |
| 8,395,567 | B2 | 3/2013 | Matsui et al. | |
| 10,210,791 | B2 | 2/2019 | Li et al. | |
| 10,897,601 | B2 | 1/2021 | Chatterjee et al. | |
| 11,011,123 | B1 | 5/2021 | Hunt et al. | |
| 11,176,901 | B1 | 11/2021 | Hunt et al. | |
| 2012/0194576 | A1* | 8/2012 | Matsui | G09G 3/3258 345/77 |
| 2012/0200611 | A1* | 8/2012 | Matsui | G09G 3/3233 345/77 |
| 2019/0005866 | A1* | 1/2019 | Li | G09G 3/3266 |
| 2020/0204764 | A1* | 6/2020 | Chatterjee | H04N 9/3164 |
| 2021/0098665 | A1* | 4/2021 | Itou | H01L 27/1255 |

* cited by examiner

*Primary Examiner* — Gene W Lee
(74) *Attorney, Agent, or Firm* — Fenwick & West LLP

(57) ABSTRACT

The present disclosure discloses a display device and a driving method of the display device. The display device includes a display panel for displaying an image, a driver for driving the display panel, a controller for controlling the driver, and a duty cycle controller for defining an unknown area in which vertical resolution information is not known and a known area in which the vertical resolution information is known within one frame when a driving frequency of the display panel is changed, and varying a duty cycle for driving the known area.

13 Claims, 10 Drawing Sheets

DISPLAY DEVICE WITH DUTY CYCLE CONTROL AND DRIVING METHOD THEREOF

CROSS-REFERENCE TO RELATED APPLICATION

This application is a continuation of U.S. patent application Ser. No. 17/965,167 filed on Oct. 13, 2022, which claims the benefit of Republic of Korea Patent Application No. 10-2021-0191865, filed on Dec. 29, 2021, each of which is hereby incorporated by reference in its entirety.

BACKGROUND

Field of the Disclosure

The present disclosure relates to a display device and a driving method thereof.

Discussion of the Related Art

With the development of information technology, the market for display devices, which are connection media between users and information, is growing. Accordingly, display devices such as a micro light emitting diode (LED) display device, a light emitting display device, a quantum dot display device, and a liquid crystal display device are increasingly used.

The display devices described above include a display panel including sub-pixels, drivers that output driving signals for driving the display panel, and a power supply that generates power to be supplied to the display panel or the drivers, and the like.

In the aforementioned display devices, when driving signals, for example, a scan signal and a data signal, are supplied to sub-pixels formed in the display panel, selected sub-pixels transmit light or directly emit light to display an image.

SUMMARY

An object of the present disclosure is to achieve uniform luminance of a display panel by re-driving the display panel in a recalculated duty cycle even when a driving frequency is changed. In addition, an object of the present disclosure is to reduce a luminance deviation between frames which may be caused by driving frequency change and flickering which may occur in the entire display surface in a structure in which a display panel is divided into at least two display areas and a frame memory is used in order to simultaneously scan the display areas.

To achieve these objects and other advantages and in accordance with the purpose of the disclosure, as embodied and broadly described herein, a display device includes a display panel configured to display an image, a driver configured to drive the display panel, a controller configured to control the driver, and a duty cycle controller configured to define an unknown area in which vertical resolution information is not known and a known area in which the vertical resolution information is known within one frame when a driving frequency of the display panel is changed, and varying a duty cycle for driving the known area.

A duty cycle of the known area may vary according to a length of an area remaining within the one frame after the vertical resolution information is known.

A duty cycle of the unknown area may be fixed to a set duty cycle of the duty cycle controller.

The duty cycle controller may define the unknown area and the known area through duty cycle recalculation during a vertical blank period occurring after the driving frequency is changed, and vary the duty cycle of the known area according to the length of the area remaining within the one frame after the vertical resolution information is known.

The driver may divide the display panel into at least two display areas and simultaneously scan the at least two display areas.

The timing controller may store a data signal of a current frame in a memory and output a data signal of a previous frame stored in the memory to display an image.

The duty cycle controller may include a resolution information detector for analyzing an input data signal to detect resolution information for each frame, a signal generator for monitoring the driving frequency and generating a control signal according to whether the driving frequency is changed, and a control signal output circuit for recalculating the duty cycle to vary the duty cycle of the known area based on the resolution information transmitted from the resolution information detector and a control signal transmitted from the signal generator and controlling a first gate control signal and a second gate control signal based on the recalculated duty cycle.

A duty ratio of a light emission time and a non-emission time of the display panel may be controlled by the first gate control signal and the second gate control signal.

In another aspect of the present disclosure, a method for driving a display device includes detecting resolution information for each frame by analyzing a data signal input to display an image on a display panel, monitoring a driving frequency for driving the display panel and generating a control signal according to whether the driving frequency is changed, and defining an unknown area in which vertical resolution information is not known and a known area in which the vertical resolution information is known within one frame based on the resolution information and the control signal when the driving frequency of the display panel is changed, and varying a duty cycle of the known area.

The varying of the duty cycle of the known area may include defining the unknown area and the known area through duty cycle recalculation during a vertical blank period occurring after the driving frequency is changed, and varying the duty cycle of the known area according to a length of an area remaining within the one frame after the vertical resolution information is known.

The duty cycle of the known area may vary according to a length of an area remaining within the one frame after the vertical resolution information is known.

The duty cycle of the unknown area may be fixed to a set duty cycle of the duty cycle controller.

The varying of the duty cycle of the known area may comprise recalculating the duty cycle and generating a first gate control signal and a second gate control signal based on the calculated duty cycle, and the duty ratio of a light emission time and a non-emission time of the display panel may be divided and controlled by the first gate control signal and the second gate control signal.

The present disclosure can achieve uniform luminance of a display panel by recalculating a duty cycle to reflect frame information to some extent and re-driving a remaining driving area in the recalculated duty cycle even when the driving frequency is changed. In addition, the present disclosure can reduce a luminance deviation between frames which may be caused by driving frequency change and flickering which may occur in the entire display surface in a structure in which a display panel is divided into at least two display areas and a frame memory is used in order to simultaneously scan the display areas.

DETAILED DESCRIPTION

Figure 1:
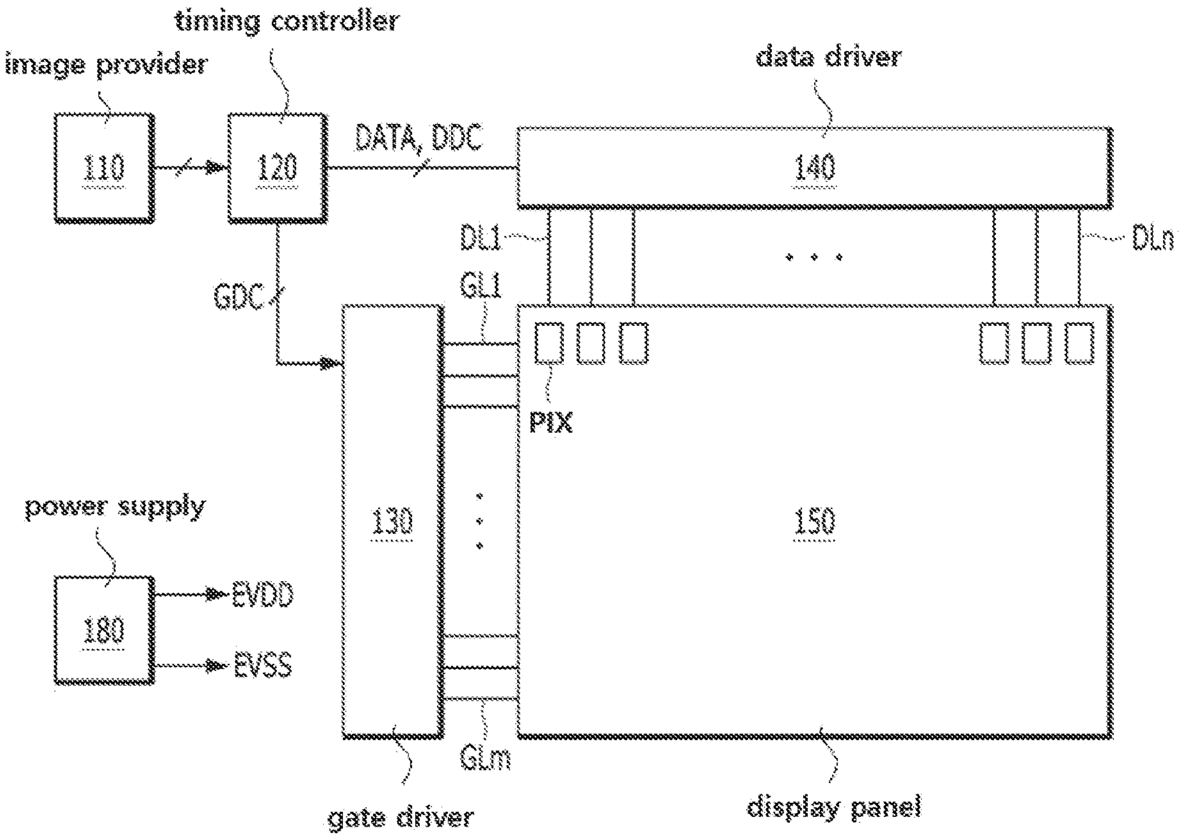
FIG. 1 is a block diagram schematically showing a display device.

The advantages and features of the present disclosure and the way of attaining the same will become apparent with reference to embodiments described below in detail in conjunction with the accompanying drawings. The present disclosure, however, is not limited to the embodiments disclosed hereinafter and may be embodied in many different forms. Rather, these exemplary embodiments are provided so that this disclosure will be thorough and complete and will fully convey the scope to those skilled in the art. Thus, the scope of the present disclosure should be defined by the claims.

In the drawings for explaining the exemplary embodiments of the present disclosure, for example, the illustrated shape, size, ratio, angle, and number are given by way of example, and thus, are not limited to the disclosure of the present disclosure. Throughout the present specification, the same reference numerals designate the same constituent elements. In addition, in the following description of the present disclosure, a detailed description of known functions and configurations incorporated herein will be omitted when it may make the subject matter of the present disclosure rather unclear. The terms "comprises", "includes" and/or "has", used in this specification, do not preclude the presence or addition of other elements unless it is used along with the term "only". The singular forms are intended to include the plural forms as well, unless the context clearly indicates otherwise.

In the following description of the embodiments, "first" and "second" are used to describe various components, but such components are not limited by these terms. The terms are used to discriminate one component from another component. Accordingly, a first component mentioned in the following description may be a second component within the technical spirit of the present disclosure.

The respective features of the various embodiments of the present disclosure may be partially or wholly coupled to and combined with each other, and various technical linkage and driving are possible. These various embodiments may be performed independently of each other, or may be performed in association with each other.

The display device according to the present disclosure may be implemented as a television, a video player, a personal computer (PC), a home theater, an automobile electric device, a smartphone, and the like, but is not limited thereto. The display device according to the present disclosure can achieve desired effects when applied to a micro light emitting diode (LED) display device capable of displaying an image based on micro LEDs. However, this is merely an example, and the configuration or method which will be described below may be applied to solve problems caused by display devices other than the micro LED display device.

Figure 2:
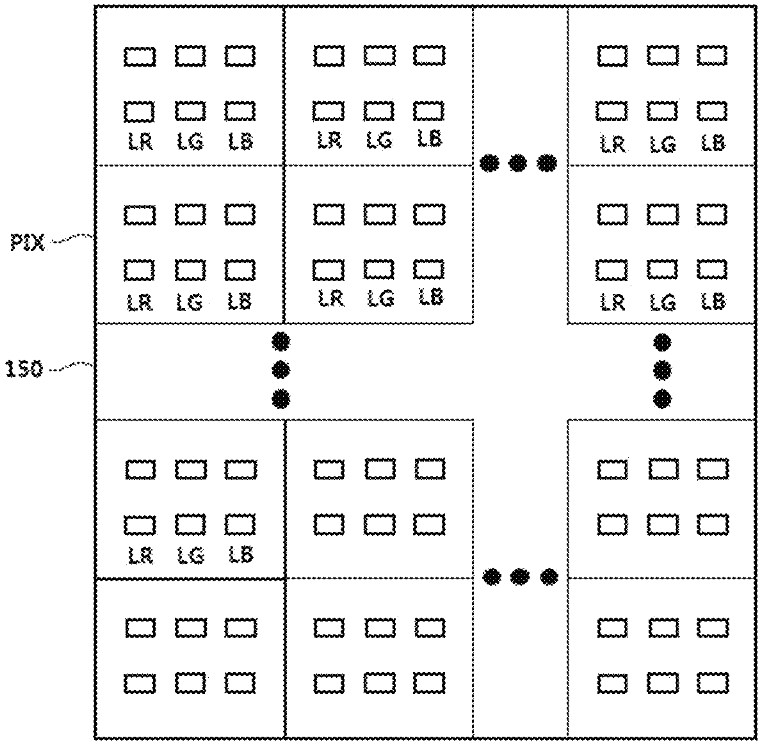
FIG. 2 is a configuration diagram schematically showing the display panel shown in FIG. 1 according to one embodiment.

FIG. 1 is a block diagram schematically showing a display device, and FIG. 2 is a configuration diagram schematically showing the display panel shown in FIG. 1 according to one embodiment.

As shown in FIGS. 1 and 2, the display device may include an image provider 110, a timing controller 120, a gate driver 130, a data driver 140, a display panel 150, a power supply 180, and the like.

The image provider (e.g., set or host system) 110 may output various driving signals along with an image data signal supplied from the outside or an image data signal stored in an internal memory. The image provider 110 may supply a data signal and various driving signals to the timing controller 120.

The timing controller 120 may output a gate timing control signal GDC for controlling the operation timing of the gate driver 130, a data timing control signal DDC for controlling the operation timing of the data driver 140, and various synchronization signals (vertical synchronization signal Vsync and horizontal synchronization signal Hsync). The timing controller 120 may supply a data signal DATA supplied from the image provider 110 along with the data timing control signal DDC to the data driver 140. The timing controller 120 may take the form of an integrated circuit (IC) and be mounted on a printed circuit board, but is not limited thereto.

The gate driver 130 may output a gate signal (or a scan signal) in response to the gate timing control signal GDC supplied from the timing controller 120. The gate driver 130 may supply gate signals to pixels included in the display panel 150 through gate lines GL1 to GLm. The gate driver 130 may be take the form of an integrated circuit (IC) and be mounted on a printed circuit board, or may be directly formed on the display panel 150 in a gate-in-panel structure.

The data driver 140 may sample and latch the data signal DATA in response to the data timing control signal DDC supplied from the timing controller 120, convert the digital data signal into an analog data voltage based on a gamma reference voltage, and output the analog data voltage. The data driver 140 may supply a data voltage to the pixels included in the display panel 150 through data lines DL1 to DLn. The data driver 140 may take the form of an IC and be mounted on the display panel 150 or mounted on a printed circuit board.

The power supply 180 may generate a first voltage having a high potential and a second voltage having a low potential that is less than the high potential based on an external input voltage supplied from the outside and output the first voltage and the second voltage through a first power line EVDD and a second power line EVSS.

The display panel 150 may display an image based on pixels PIX including micro light emitting diodes (LEDs) that emit light in response to a gate signal and a data voltage. One pixel PIX may include a plurality of micro LEDs. The plurality of micro LEDs may include red micro LEDs LR, green micro LEDs LG, and blue micro LEDs LB. Meanwhile, although FIG. 2 illustrates an example in which a plurality of red micro LEDs LR, green micro LEDs LG, and blue micro LEDs LB are included in one pixel PIX, which are vertically disposed in the same manner, the present disclosure is not limited thereto.

Figure 3:
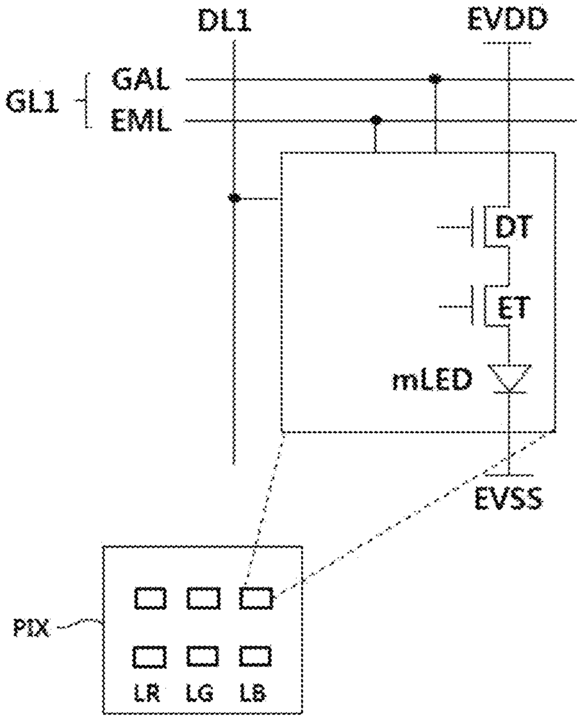
FIGS. 3 and 4 are diagrams for briefly describing a configuration of a pixel and a duty driving method according to one embodiment.
Figure 4:
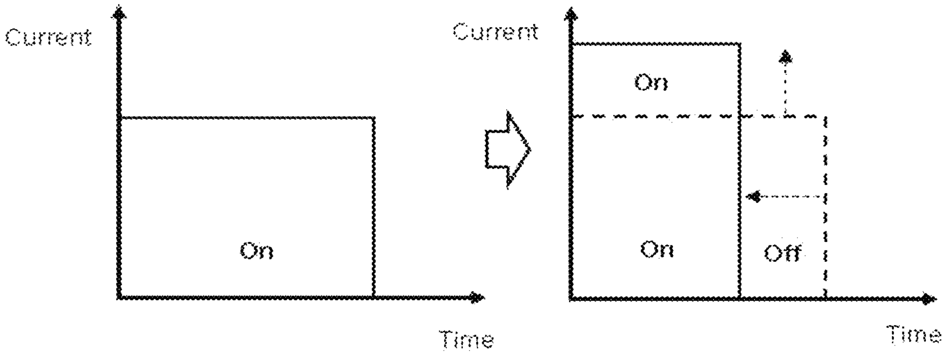
Figure 5:
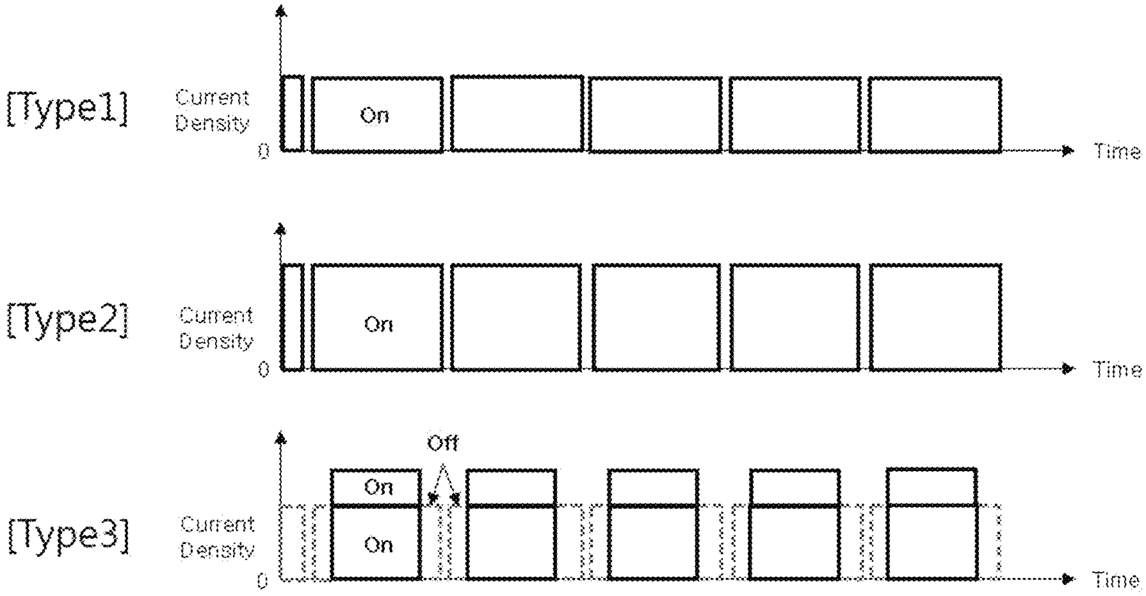
FIG. 5 is a diagram for describing advantages according to duty driving of pixels according to one embodiment.

FIGS. 3 and 4 are diagrams for briefly describing the configuration of a pixel and a duty driving method according to one embodiment, and FIG. 5 is a diagram for describing advantages according to duty driving of the pixel according to one embodiment.

As shown in FIGS. 3 and 4, one pixel PIX may emit light based on at least one micro LED mLED, a driving transistor DT, a control transistor ET, and the like. Meanwhile, since there are various configurations and methods of circuits for driving a micro LED mLED, it is noted that only the micro LED mLED, the driving transistor DT, and the control transistor ET related to the present disclosure are illustrated and described.

The driving transistor DT may generate a driving current for driving the micro LED mLED based on a scan signal applied through a scan signal line GAL included in the first gate line GL1. The control transistor ET may control a time for which the driving current is transmitted to the micro LED mLED based on an emission control signal applied through an emission control line EML included in the first gate line GL1. That is, the control transistor ET may serve to control the driving current applied to the micro LED mLED and a light emission time.

The left side of FIG. 4 illustrates a current driving method for controlling only the driving current, and the right side of FIG. 4 illustrates a duty driving method for controlling both the driving current and driving time. By controlling a turn-on time On and a turn-off time Off using the control transistor ET, it is possible to control the driving current applied to the micro LED mLED and the light emission time. Therefore, the duty driving method can be regarded as a driving method suitable for the micro LED mLED requiring a high current operation. Meanwhile, the two methods shown in FIG. 4 can exhibit the same luminance. This is because, in the case of the duty driving method shown on the right side, the driving current can be increased although the light emission time is decreased and thus the display panel has the same display area as in the case of the current driving method shown on the left side.

As shown in FIG. 5, a first type Type1 current driving method (having low current density) has low light efficiency, and thus it may be difficult to achieve a desired luminance through micro LEDs. A second type Type2 current driving method (having high current density) can increase the light efficiency, and thus can achieve a desired luminance through micro LEDs, but power consumption may increase. A duty driving method of third type Type3 can reduce the light emission time instead of increasing current density, and thus can achieve a desired luminance through micro LEDs and reduce power consumption.

Therefore, the duty driving method is spotlighted because it can achieve a desired luminance and reduce power consumption when applied to a micro LED display device implemented based on micro LEDs.

Figure 6:
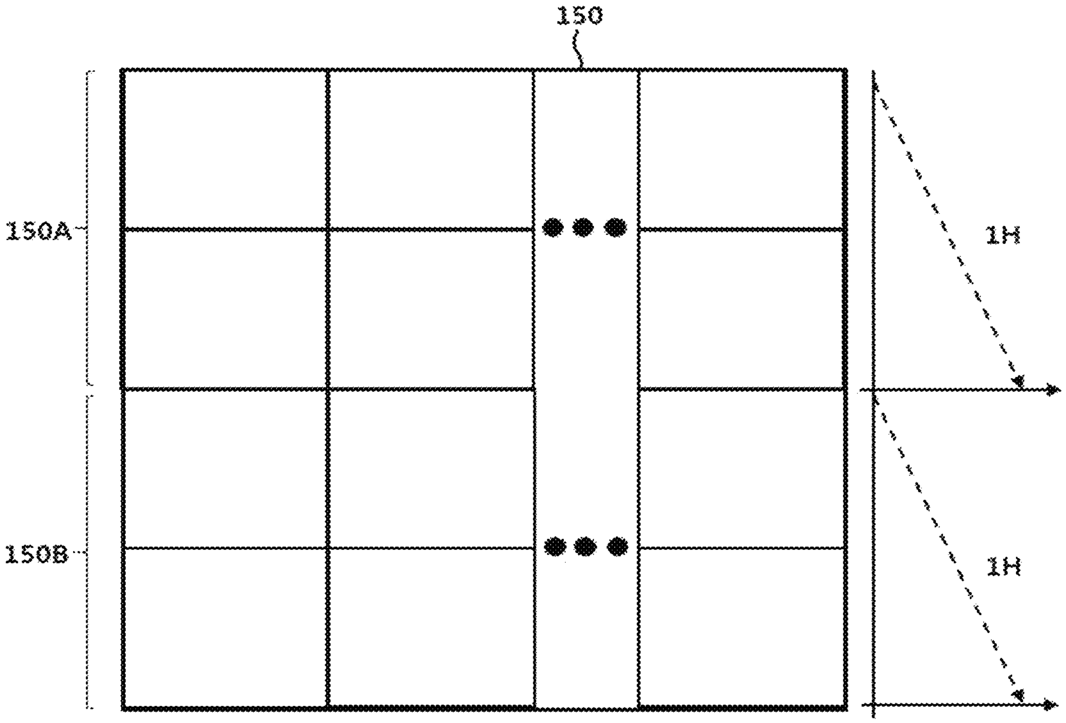
FIGS. 6 and 7 are diagrams for describing a scanning method of a display device and a device configuration therefor according to one embodiment.
Figure 7:
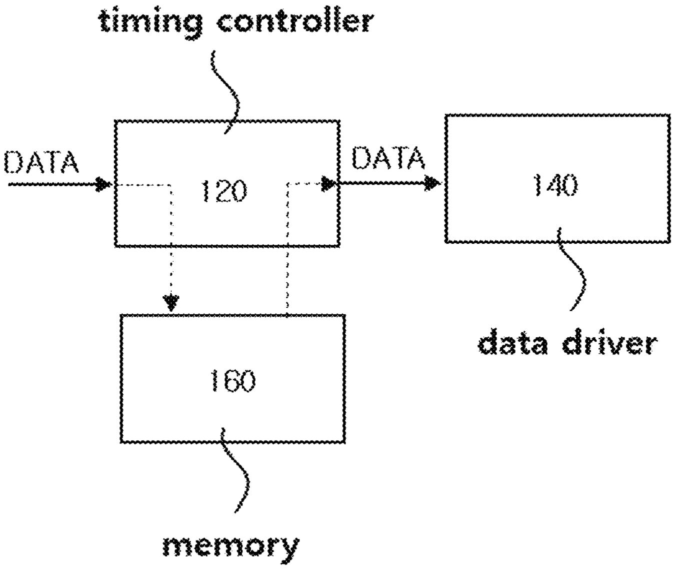

FIGS. 6 and 7 are diagrams for describing a scanning method of the display device and a device configuration therefor.

As shown in FIGS. 6 and 7, in the display device, the display panel 150 may be divided into at least two display areas 150A and 150B by a driver such as the gate driver 130 and the data driver 140 and may be simultaneously scanned. When the upper display area 150A and the lower display area 150B are simultaneously scanned in this manner, a physical time required to define one horizontal time 1H can be reduced compared to a method of sequentially driving one display area.

To enable the aforementioned scanning method, the timing controller 120 may be configured in a frame memory application structure in which a data signal DATA of the current frame is stored in the memory 160 and a data signal DATA of a previous frame stored in the memory 160 is output to the data driver 140.

FIGS. 8 to 11 are diagrams for describing considerations at the time of driving the display device based on the frame memory application structure according to one embodiment.

Figure 8:
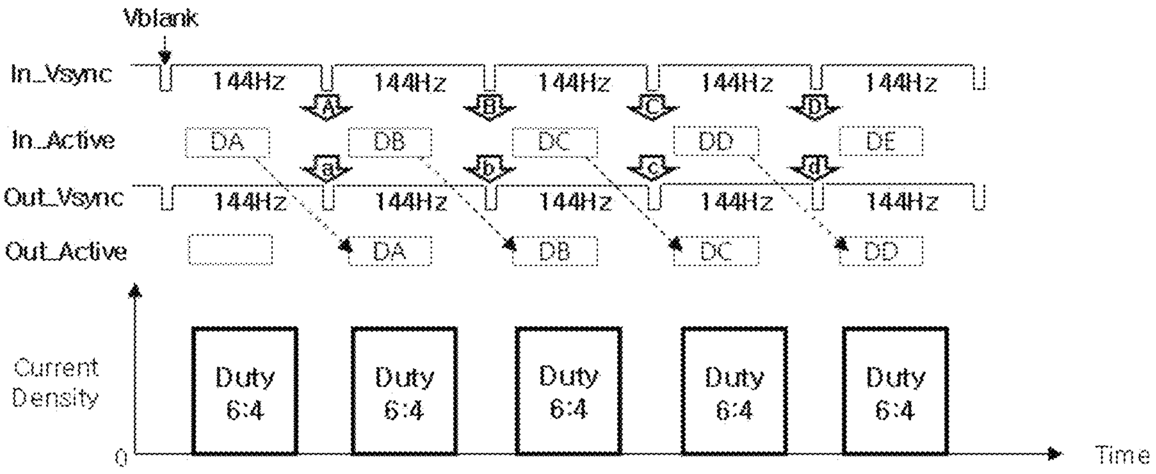
FIGS. 8 to 11 are diagrams for describing considerations at the time of driving a display device based on a structure in which a frame memory is applied according to one embodiment.
Figure 9:
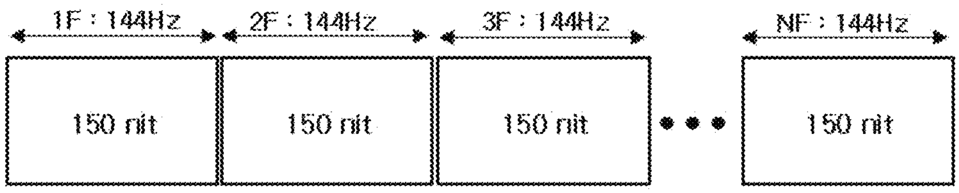

As shown in FIGS. 7, 8, and 9, when the display device is driven based on the same driving frequency (e.g., 144 Hz), an input vertical synchronization signal In_Vsync and an input active signal In_Active applied from the outside may be output from the timing controller 120 after having the same delay time. This can be ascertained by referring to an output vertical synchronization signal Out_Vsync and an output active signal Out_Active output from the timing controller 120. In FIG. 8, Vblank denotes a vertical blank period present between vertical synchronization signals to discriminate between frames.

Due to the aforementioned driving characteristics, an image equally delayed for every frame may be displayed on the display panel. This can be ascertained by referring to an A-th data signal DA of the output active signal Out_Active output after having a delay time of one frame from an A-th data signal DA of the input active signal In_Active.

In the duty driving method, a duty ratio can be calculated based on vertical resolution of an image to be displayed. In the case of the frame memory application structure, the vertical resolution does not change as long as the driving frequency is maintained uniform (e.g., 144 Hz), and thus a point in time A at which resolution information of an image is transmitted and a point in time a at which the resolution information of the image is required may be the same. In this case, even if synchronization signals do not match, a refresh rate does not change and duty driving information is constant, and thus a slight difference between the point in time A and the point in time a may not be a considerable problem.

For this reason, the display panel can express the same luminance (e.g., 150 nit) while maintaining the same duty ratio (6:4) corresponding to images during a period of the first frame to the N-th frame (1F to NF) in which fixed refresh rate driving at the same driving frequency is performed. Accordingly, the frame memory application structure is applicable to a fixed refresh rate driving method in which the same driving frequency is maintained.

Figure 10:
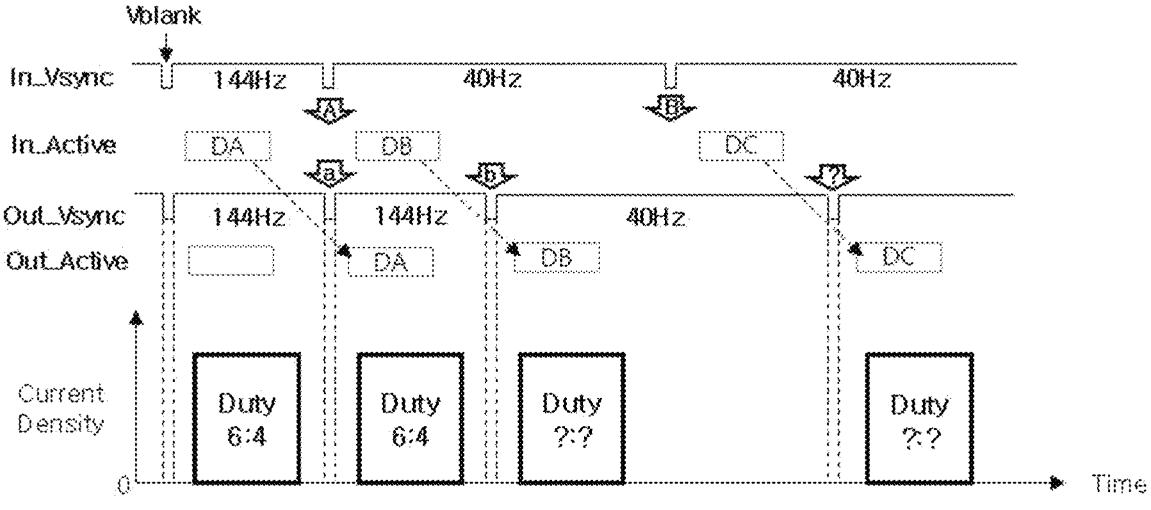
Figure 11:
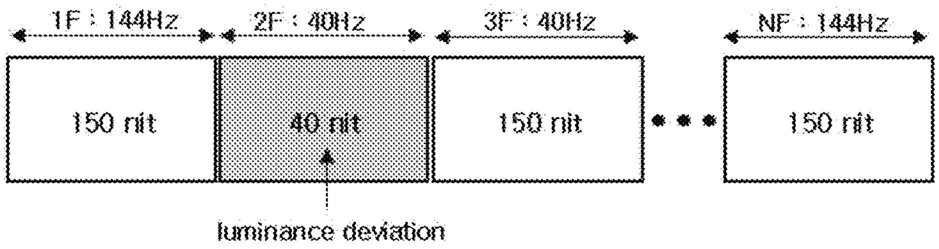

As shown in FIGS. 7, 10 and 11, when the display device is driven based on unequal driving frequencies (e.g., 144 Hz→40 Hz), an input vertical synchronization signal In_Vsync applied from the outside may be output from the timing controller 120 after having unequal delay time. This can be ascertained by referring to an output vertical synchronization signal Out_Vsync and an output active signal Out_Active output from the timing controller 120.

Due to the aforementioned driving characteristics, an image equally delayed for each frame may be displayed on the display panel, but a difference may occur between the input vertical synchronization signal In_Vsync and the output vertical synchronization signal Out_Vsync. This can be ascertained by referring to a difference between the time when the driving frequency of the input vertical synchronization signal In_Vsync is changed from a high frequency (144 Hz) to low frequency (40 Hz) and the time when the driving frequency of the output vertical synchronization signal Out_Vsync is changed from the high frequency (144 Hz) to the low frequency (40 Hz). Meanwhile, driving at a low driving frequency is also referred to as refresh driving.

The duty ratio in the duty driving method may be calculated based on the vertical resolution of an image to be displayed. In the case of the frame memory application structure, when the driving frequency is changed from a high frequency to a low frequency (e.g., 144 Hz→40 Hz), the vertical resolution also changes and thus a point in time B at which the resolution information of an image is transmitted may be delayed from a point in time b at which the resolution information of the image is required.

For this reason, the display panel may express an unexpected luminance (e.g., 40 nit) while having a duty ratio (?:?) (Here, the question mark indicates an unknown duty ratio.) that does not correspond to images during the period of a second frame 2F positioned between the first frame 1F and the third frame 3F in which variable refresh rate driving at a variable driving frequency is performed. Therefore, it is necessary to consider that a luminance deviation may be caused when the frame memory application structure is applied to the variable refresh rate driving method using a variable driving frequency.

Meanwhile, in the above description, a duty ratio of 6:4 is an example in the case of vertical resolution (V Total)=2,205 (144 Hz)/8,122 (40 Hz). In the duty ratio of 6:4, 6 corresponds to a turn-on duty ratio in which a light emitting element emits light and 4 corresponds to a turn-off duty ratio in which the light emitting element does not emit light. The concept of the turn-on duty ratio and the turn-off duty ratio will be understood in more detail through the following description.

Figure 12:
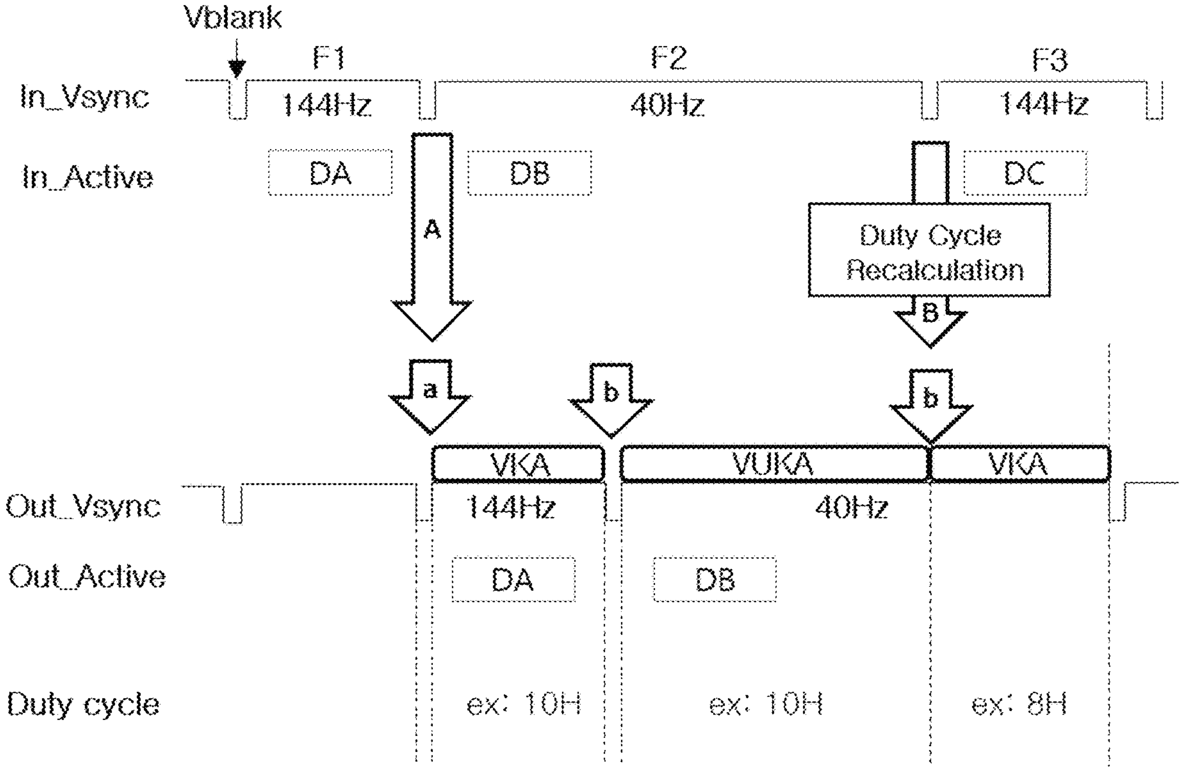
FIG. 12 is a diagram for describing an adaptive duty varying method according to an embodiment of the present disclosure.
Figure 13:
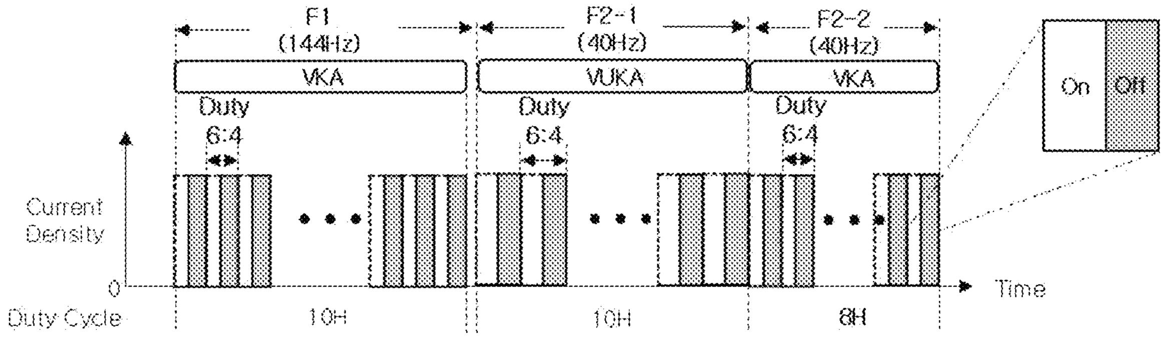
FIGS. 13 and 14 are exemplary diagrams of adaptive duty variation according to the embodiment of the present disclosure.
Figure 14:
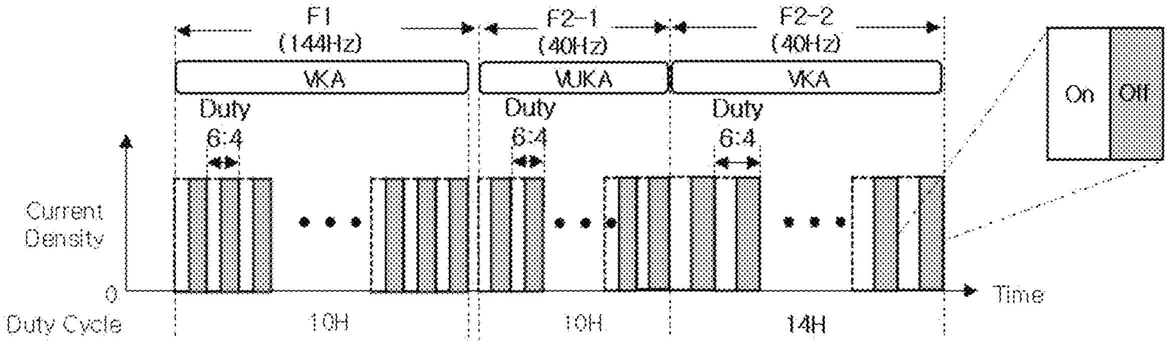
Figure 15:
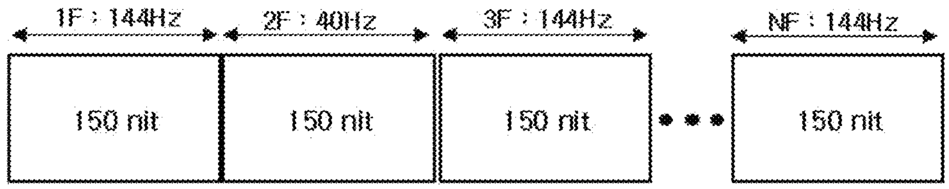
FIG. 15 is a diagram for describing advantages according to the embodiment of the present disclosure.
Figure 16:
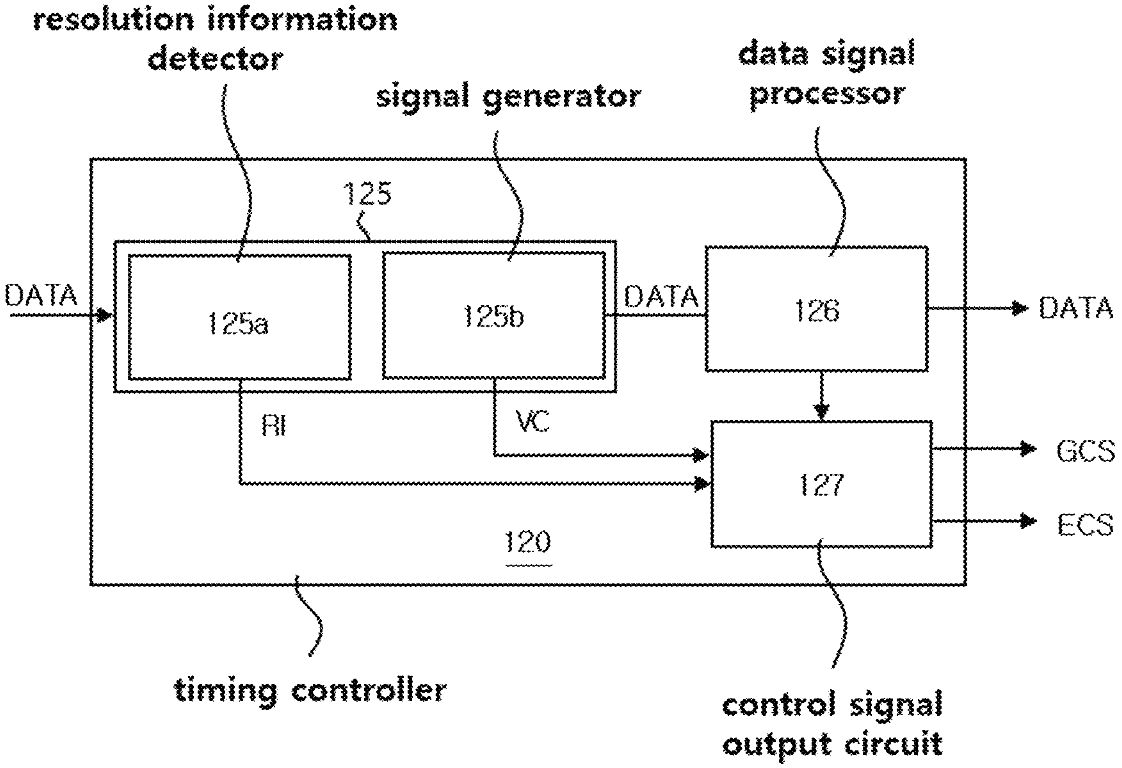
FIG. 16 is an exemplary configuration diagram of a timing controller for adaptive duty variation according to an embodiment of the present disclosure.

FIG. 12 is a diagram for describing an adaptive duty varying method according to an embodiment of the present disclosure, FIGS. 13 and 14 are exemplary diagrams of adaptive duty variation according to an embodiment of the present disclosure, FIG. 15 is a diagram for describing advantages according to an embodiment of the present disclosure, and FIG. 16 is an exemplary configuration diagram of a timing controller for adaptive duty variation according to an embodiment of the present disclosure.

The adaptive duty varying method according to an embodiment of the present disclosure is a driving method capable of solving a problem of luminance deviation which may be caused when variable refresh rate driving is performed in a display device having the frame memory application structure. In addition, the adaptive duty varying method according to the embodiment of the present disclosure can reduce flickering which may be seen on the entire display surface because the problem of luminance deviation between frames can be solved.

As shown in FIGS. 12 to 16, when the display device is driven based on unequal (e.g., different) driving frequencies (e.g., 144 Hz→40 Hz), an input vertical synchronization signal In_Vsync applied from the outside may be output from the timing controller 120 after having an unequal delay time. This can be ascertained by referring to an output vertical synchronization signal Out_Vsync and an output active signal Out_Active output from the timing controller 120.

Due to the aforementioned driving characteristics, an image equally delayed for each frame may be displayed on the display panel, but a difference may occur between the input vertical synchronization signal In_Vsync and the output vertical synchronization signal Out_Vsync. This can be ascertained by referring to a difference between the time when the driving frequency of the input vertical synchronization signal In_Vsync is changed from a high frequency (144 Hz) to a low frequency 40 Hz and the time when the driving frequency of the output vertical synchronization signal Out_Vsync is changed from the high frequency 144 Hz to the low frequency 40 Hz.

The duty ratio in the duty driving method may be calculated based on the vertical resolution of an image to be displayed. In the case of the frame memory application structure, when the driving frequency is changed from a high frequency to a lower frequency (e.g., 144 Hz→40 Hz), the vertical resolution also changes and thus the point in time B at which the resolution information of an image is transmitted may be delayed from the point in time b at which the resolution information is required.

Since it is difficult to know what duty ratio is used for driving an area in which the point in time B at which the resolution information of an image is transmitted is delayed from the point in time b at which the resolution information of the image is required, such as the second frame F2, this area may be defined as a vertical resolution unknown area VUKA. On the other hand, the duty ratio used for driving an area in which the point in time A at which resolution information of an image is transmitted is the same as the point in time a at which the resolution information of the image is required, such as the first frame F1, can be known and thus this area may be defined as a vertical resolution information known area VKA.

In the frame memory application structure, a luminance deviation may be caused by the vertical resolution information unknown area VUKA when the variable refresh rate driving method using a variable driving frequency is applied. Accordingly, in the embodiment of the present disclosure, the vertical resolution information unknown area VUKA and the vertical resolution information known area VKA are distinguished and driven according to whether the vertical resolution information is known. This will be described below.

(1) When the vertical resolution information unknown area VUKA is generated due to change in the driving frequency, the display device is driven in a duty cycle (default) set in the vertical resolution information unknown area VUKA for a predetermined time. That is, the duty cycle of the vertical direction resolution information unknown area VUKA may be fixed. The predetermined time for which the display device is driven in the duty cycle set in the vertical resolution information unknown area VUKA may be a period until a vertical resolution information known area VKA is ascertained.

(2) The remaining driving area is checked at a point in time at which the vertical resolution information known area VKA is ascertained after the vertical resolution information unknown area VUKA, and the display device is driven in a duty cycle recalculated to be suitable for the remaining driving area. That is, the duty cycle of the vertical resolution information known area VKA may be variable, but this may be affected by the remaining driving area.

The vertical direction resolution information known area VKA may be ascertained through duty cycle recalculation performed for a vertical blank period Vblank occurring after the driving frequency of the input vertical synchronization signal In_Vsync is changed from a high frequency (144 Hz) to a low frequency (40 Hz). By recalculating the duty cycle, the driving area remaining after the vertical resolution information unknown area VUKA may be checked. In addition, the remaining driving area may be included in the vertical resolution information known area VKA because re-driving (normal driving) is performed in the recalculated duty cycle and the duty can be known.

Therefore, if the duty cycle is recalculated based on the embodiment of the present disclosure and re-driving is performed in this duty cycle, the second frame F2 may be divided into an area for driving in a state in which the vertical resolution information is not known and an area for driving in a state in which the vertical resolution information is known.

As a result, one frame such as the second frame F2 is divided into a vertical resolution information unknown area VUKA for driving in a first duty cycle (e.g., 10H) and a vertical resolution information known area VKA for driving in a second duty cycle (e.g., 8H). Here, the first duty cycle 10H may include a turn-on duty of 6H and a turn-off duty of 4H, and the second duty cycle 8H may include a turn-on duty of 4.8H and a turn-off duty of 3.2H.

As described above, if the duty cycle is recalculated based on the embodiment of the present disclosure and re-driving is performed in this duty cycle, the duty cycle may vary according to the length (the number of lines) of the vertical resolution information known area VKA remaining within one frame, as in the first example of FIG. 13 and the second example of FIG. 14. That is, a duty cycle of the known area may vary according to a length of an area remaining within the one frame after the vertical resolution information is known.

The first example of FIG. 13 may correspond to a case in which the duty cycle (8H) of the vertical resolution information known area VKA is less than the duty cycle (10H) of the vertical resolution information unknown area VUKA. In other words, the number of lines occupied by the vertical resolution information unknown area VUKA is greater than the number of lines occupied by the vertical resolution information known area VKA in the second frame.

In the case of the first example, the (2-1)-th frame F2-1, which is the vertical resolution information unknown area VUKA, may be driven in the first duty cycle (10H) set therein to maintain the duty ratio (6:4), and the (2-2)-th frame F2-2, which is the vertical resolution information known area VKA, may be driven in the recalculated second duty cycle (8H) to maintain the duty ratio (6:4).

The second example of FIG. 14 may correspond to a case in which the duty cycle (14H) of the vertical resolution information known area VKA is greater than the duty cycle (10H) of the vertical resolution information unknown area VUKA. In other words, the number of lines occupied by the vertical resolution information known area VKA is greater than the number of lines occupied by the vertical resolution information unknown area VUKA in the second frame.

In the case of the second example, the (2-1)-th frame F2-1, which is the vertical resolution information unknown area VUKA, may be driven in the first duty cycle (10H) set therein to maintain the duty ratio (6:4), and the (2-2)-th frame F2-2, which is the vertical resolution information known area VKA, may be driven in the recalculated third duty cycle (14H) to maintain the duty ratio (6:4).

In addition, the embodiment of the present disclosure may employ a duty division driving method in which a light emission time and a non-emission time of a light emitting element are divided into a plurality of times within one frame according to the duty cycle. In this case, the light emission time of the light emitting element may correspond to turn-on duty (or turn-on time) On and the non-emission time of the light emitting element may correspond to turn-off duty (or turn-off time) Off. Accordingly, the control transistor ET shown in FIG. 3 may be in a turn-on state at the turn-on duty On and may be in a turn-off state at the turn-off duty Off.

Meanwhile, in the above description, it is noted that the duty ratio of 6:4 is exemplified. In addition, although driving in a duty cycle in which a vertical resolution information unknown area VUKA is set has been exemplified in the above description, driving may be performed in a duty cycle of a vertical resolution information known area VKA before the driving frequency is changed.

As can be ascertained from FIG. 15, according to the embodiment of the present disclosure, the vertical resolution information known area VKA can be driven in a recalculated duty cycle, and thus a uniform luminance (e.g., 150 nit) can be expressed even if the driving frequency is changed to a high frequency (144 Hz), a low frequency (40 Hz), and then back to the high frequency (144 Hz). In addition, as the second frame 2F is driven at a lower frequency compared to other frames 1F, 3F, etc., luminance non-uniformity may occur in some areas. However, since the remaining driving area is re-driven in the recalculated duty cycle according to the embodiment of the present disclosure, luminance similar to or equivalent to that of other frames can be expressed in the entire frame, and thus uniform luminance can be achieved.

In the embodiment of the present disclosure, the timing controller 120 may be configured as shown in FIG. 16 to recalculate a duty cycle and then perform re-driving in the recalculated duty cycle. According to the embodiment of the present disclosure, the timing controller 120 may include a resolution information detector **125*a* (e.g., a circuit), a signal generator 125*b* (e.g., a circuit), a data signal processor 126, a control signal output unit (or circuit) 127**, and the like.

The resolution information detector **125*a* may be configured to analyze input data signal DATA to detect resolution information for each frame. The resolution information detector 125*a* may transmit resolution information RI obtained through analysis of the input data signal DATA to the control signal output unit 127**.

The signal generator **125*b* may be configured to generate a control signal VC for controlling the display device based on the input data signal DATA. The signal generator 125*b* may monitor the driving frequency, generate the control signal VC for controlling the display device according to whether the driving frequency is changed, and transmit the control signal VC to the control signal output unit 127**.

The data signal processor 126 may be configured to output the input data signal DATA after image processing and the like. The data signal processor 126 may perform image processing for outputting a data signal suitable for the display panel based on an algorithm configured therein.

The control signal output unit 127 may be configured to generate a first gate control signal GCS and a second gate control signal ECS based on the resolution information RI transmitted from the resolution information detector **125*a***, the control signal VC transmitted from the signal generator 125*b*, and the data signal DATA transmitted from the data signal processor 126. The first gate control signal GCS may be a signal for controlling a scan signal applied through a scan signal line, and the second gate control signal ECS may be a signal for controlling a light emission control signal applied through a light emission control line.

The control signal output unit 127 may recalculate the duty cycle to vary the duty cycle of the known area based on the resolution information RI, the control signal VC, and the data signal DATA, and control (change) the first gate control signal GCS and the second gate control signal ECS based on the recalculated duty cycle. The control signal output unit 127 may recalculate the duty cycle during a vertical blank period that is generated after the driving frequency is changed or after the driving frequency is changed from a high frequency to a low frequency or from a low frequency to a high frequency.

The control signal output unit 127 may select a suitable cycle within a cycle range set therein when duty division driving is performed or a duty division driving cycle is changed. To this end, the control signal output unit 127 may refer to a lookup table (experimental values) to select an optimal duty cycle for each remaining driving area.

Meanwhile, the resolution information detector 125*a*, the signal generator 125*b*, and the control signal output unit 127 for recalculating the duty cycle and generating a control signal based on the recalculated duty cycle may be collectively referred to as a duty cycle controller. The duty cycle controller may be embedded in the timing controller 120, or separately disposed from the timing controller 120.

As mentioned above, the adaptive duty varying method according to the embodiment of the present disclosure can be applied to other display devices having problems due to division of a display panel into at least two display areas and using a frame memory to scan the display areas simultaneously.

As described above, according to the present disclosure, it is possible to achieve uniform luminance of the display panel by recalculating the duty cycle such that frame information can be reflected to some extent even when the driving frequency is changed, and then re-driving the remaining driving area in the recalculated duty cycle. In addition, the present disclosure can reduce luminance deviation between frames which may be caused by driving frequency change and flickering in the overall display surface in a structure in which a display panel is divided into at least two display areas and a frame memory is used in order to simultaneously scan the display areas.

What is claimed is:

1. A micro light emitting diode display device comprising:

a display panel configured to display an image based on at least one pixel;

a driver configured to drive the display panel;

a controller configured to control the driver; and a duty cycle controller configured to define a first area in which vertical resolution information is unknown and a second area in which the vertical resolution information is known within one frame responsive to a change in a driving frequency of the display panel, and vary a duty cycle for driving the second area.

2. The micro light emitting diode display device according to claim 1, wherein the at least one pixel includes at least one micro light emitting diode, and the at least one micro light emitting diode includes a selected one of a red micro light emitting diode, a green micro light emitting diode, and a blue micro light emitting diode.

3. The micro light emitting diode display device according to claim 1, wherein the at least one pixel includes:

at least one micro light emitting diode configured to emit light, a driving transistor configured to generate a driving current for driving the at least one micro light emitting diode, and a control transistor configured to control the driving current applied to the at least one micro light emitting diode and a light emission time.

4. The micro light emitting diode display device according to claim 3, wherein the driving transistor is driven based on a scan signal applied through a scan signal line included in a first gate line, and the control transistor is driven based on an emission control signal applied through an emission control line included in the first gate line.

5. The micro light emitting diode display device according to claim 1, wherein the first area is defined as an area in which a first time point in which resolution information of a first image is required and a second time point in which resolution information of the first image is transmitted are different, and the second area is defined as an area where a third time point in which resolution information of the first image is required and a fourth time point in which resolution information of the first image is transmitted are identical.

6. The micro light emitting diode display device according to claim 1, wherein a duty cycle of the second area varies according to a length of an area remaining within the one frame after the vertical resolution information is known.

7. The micro light emitting diode display device according to claim 1, wherein a duty cycle of the first area is fixed to a set duty cycle of the duty cycle controller.

8. The micro light emitting diode display device according to claim 1, wherein the duty cycle controller defines the first area and the second area through duty cycle recalculation during a vertical blank period that occurs after the driving frequency is changed, and varies the duty cycle of the second area according to a length of the area remaining within the one frame after the vertical resolution information is known.

9. The micro light emitting diode display device according to claim 1, wherein the duty cycle controller includes:

a resolution information detector configured to analyze an input data signal to detect resolution information for each frame;

a signal generator configured to monitor the driving frequency and generate a control signal according to whether the driving frequency is changed; and a control signal output circuit configured to recalculate the duty cycle to vary the duty cycle of the second area based on the resolution information transmitted from the resolution information detector and the control signal transmitted from the signal generator, and control a first gate control signal and a second gate control signal based on the recalculated duty cycle.

10. The micro light emitting diode display device according to claim 9, wherein a duty ratio of a light emission time and a non-emission time of the display panel is divided and controlled by the first gate control signal and the second gate control signal.

11. The micro light emitting diode display device according to claim 9, wherein the duty cycle controller further includes a data signal processor configured to output a data signal suitable for the display device.

12. The micro light emitting diode display device according to claim 11, wherein the control signal output circuit is further configured to generate the first gate control signal and the second gate control signal based on the resolution information transmitted from the resolution information detector, the control signal transmitted from the signal generator and the data signal transmitted from the data signal processor.

13. The micro light emitting diode display device according to claim 1, wherein the duty cycle controller maintains a same duty ratio in the first area and the second area.

* * * * *